(12) United States Patent
Yang et al.

(10) Patent No.: US 11,546,174 B2
(45) Date of Patent: Jan. 3, 2023

(54) WIRELESS TERMINAL AUTHENTICATION

(71) Applicant: Apple Inc., Cupertino, CA (US)

(72) Inventors: Xiangying Yang, Cupertino, CA (US); Ahmer A. Khan, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 391 days.

(21) Appl. No.: 16/708,310

(22) Filed: Dec. 9, 2019

(65) Prior Publication Data

US 2020/0186367 A1 Jun. 11, 2020

Related U.S. Application Data

(60) Provisional application No. 62/778,240, filed on Dec. 11, 2018.

(51) Int. Cl.
| | |
|---|---|
| *H04L 29/06* | (2006.01) |
| *H04L 9/32* | (2006.01) |
| *H04L 9/08* | (2006.01) |
| *G06F 21/35* | (2013.01) |
| *H04W 4/80* | (2018.01) |
| *H04L 9/40* | (2022.01) |
| *H04L 67/104* | (2022.01) |
| *G06F 21/33* | (2013.01) |

(52) U.S. Cl.
CPC ............ *H04L 9/3268* (2013.01); *G06F 21/33* (2013.01); *G06F 21/35* (2013.01); *H04L 9/0825* (2013.01); *H04L 63/0823* (2013.01); *H04L 67/104* (2013.01); *H04W 4/80* (2018.02)

(58) Field of Classification Search
CPC . H04L 9/3268; H04L 9/0825; H04L 63/0823; H04L 67/104; H04L 63/102; H04L 67/306; H04L 2209/80; H04L 9/321; H04L 9/3247; H04L 9/3265; G06F 21/33; G06F 21/35; G06F 21/44; H04W 4/80; H04W 12/069; H04W 4/02; H04W 12/08; H04W 12/47
See application file for complete search history.

(56) References Cited

U.S. PATENT DOCUMENTS

| | | | | |
|---|---|---|---|---|
| 5,922,074 | A  * | 7/1999 | Richard ................ | H04L 63/101 726/21 |
| 9,780,950 | B1 * | 10/2017 | Dundas ............... | H04L 63/0838 |
| 10,855,674 | B1 * | 12/2020 | Geusz .................... | H04L 63/20 |

(Continued)

*Primary Examiner* — Harunur Rashid
(74) *Attorney, Agent, or Firm* — BakerHostetler (57) ABSTRACT

A device for wireless terminal authentication may include at least one processor configured to receive, from a wireless terminal device, a request for user information, the request comprising a certificate corresponding to the wireless terminal device. The at least one processor may be further configured to verify the certificate based at least in part on a public key stored on the electronic device. The at least one processor may be further configured to, when the certificate is verified, determine whether the certificate indicates that the wireless terminal device is authorized to receive the requested user information. The at least one processor may be further configured to transmit, to the wireless terminal device, the requested user information when the certificate indicates that the wireless terminal device is authorized to receive the requested user information.

20 Claims, 6 Drawing Sheets

(56) References Cited

U.S. PATENT DOCUMENTS

| | | | | |
|---|---|---|---|---|
| 2001/0029482 A1* | 10/2001 | Tealdi | .................. | G06Q 40/025 |
| | | | | 705/38 |
| 2002/0138771 A1* | 9/2002 | Dutta | .................... | H04L 63/102 |
| | | | | 726/26 |
| 2003/0220097 A1* | 11/2003 | Aono | .................... | H04M 1/667 |
| | | | | 455/410 |
| 2005/0005097 A1* | 1/2005 | Murakawa | .......... | H04L 63/0823 |
| | | | | 713/156 |
| 2005/0246524 A1* | 11/2005 | Brownell | ................ | G06F 21/10 |
| | | | | 713/156 |
| 2011/0113029 A1* | 5/2011 | Kaal | ..................... | H04L 67/104 |
| | | | | 707/723 |
| 2015/0186657 A1* | 7/2015 | Nakhjiri | ................ | H04L 9/0825 |
| | | | | 713/193 |
| 2015/0193701 A1* | 7/2015 | Sohn | ...................... | G06Q 10/02 |
| | | | | 705/5 |
| 2016/0210626 A1* | 7/2016 | Ortiz | .................. | G06Q 20/40 |
| 2018/0262347 A1* | 9/2018 | Levy | ........................ | H04L 9/006 |
| 2020/0304318 A1* | 9/2020 | Kravitz | .............. | H04L 63/0876 |

\* cited by examiner

| TAG | INFORMATION | DEFAULT TRUST POLICY |
|---|---|---|
| XX01 | NAME | A, B |
| XX02 | DOB | A |
| XX03 | DRIVING PRIVILEGE | A, B |
| XX04 | AGE VERIFICATION | ALL |

WIRELESS TERMINAL AUTHENTICATION

CROSS REFERENCE TO RELATED APPLICATIONS

This application claims the benefit of priority to U.S. Provisional Patent Application No. 62/778,240 entitled "Wireless Terminal Authentication," filed on Dec. 11, 2018, the disclosure of which is hereby incorporated herein in its entirety.

TECHNICAL FIELD

The present description relates generally to wireless terminal authentication, including wireless terminal authentication for wireless transfer of user information.

BACKGROUND

Physical identity credentials, such as driver's licenses, passports, etc., may be migrating to digital form, such as digital identity credentials stored on electronic devices. As the credentials themselves change, so too will the manner in which a user provides his identity credential to a third party, such as a government official, a commercial entity, and the like. For example, the user may wirelessly transmit their digital identity credential from their device to a wireless terminal device of a third party.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

In a digital identity credential system, a user may provide all or part of their digital identity credential, such as a mobile driver's license, to wireless terminal devices of third parties, such as a wireless terminal device of a government official, a store employee, and the like. Although the third party may be able to verify the identity of the user upon receiving the user's digital identity credential, the user may be unable to verify the third party associated with the wireless terminal device prior to providing/releasing their digital identity credential, and the user may be unable to verify that the third party is actually authorized to receive all or part of the user's digital identity credential. For example, the user may be unable to verify that a given wireless terminal device, such as a tablet device, is associated with a commercial entity, such as a hotel (which may be authorized to receive all or part of the user's digital identity credential), or is a personal device of a hotel employee (who may not be authorized to receive all or part of the user's digital identity credential).

In the subject wireless terminal authentication system, third party entities, such as commercial entities, government entities, and the like, register their wireless terminal devices with issuers of digital credentials, such as a government entity issuing mobile driver's licenses, and/or certificate authorities associated with such issuers. A digital credential issuer and/or associated certificate authority may issue, and/or coordinate issuance, of certificates to the wireless terminal devices associated with the third party entities. The certificates (and/or certificate chains) may be signed by the issuer and/or associated certificate authority, and may indicate the user information contained in the digital identity credentials that the wireless terminal device is authorized to receive. For example, the wireless terminal device of a police officer (or other law enforcement personnel) may be authorized to receive the entirety of the digital identity credential, while the wireless terminal device of a liquor store may be authorized to only receive an indication of whether the user is at least 21 years old.

The public keys of the issuers and/or associated certificate authorities may be provisioned onto user devices, such as when a user's digital identity credential is issued to their device. Thus, when a wireless terminal device requests all or part of an identity credential of a user, such as a mobile driver's license, the wireless terminal device can include its certificate with the request (if it has been issued one). The user's device, upon receiving request, can verify, using the public key of the issuer of the identity credential being requested, that the certificate (or a certificate in a corresponding certificate chain) is signed by the issuer and/or a certificate authority associated with the issuer. Upon verifying the certificate, the user's device can determine whether the wireless terminal device is authorized by the issuer to receive the user information being requested. If the wireless terminal device is authorized to receive the user information being requested, the user's device can provide the user information to the wireless terminal device.

In one or more implementations, the user may be able to indicate a user preference to automatically send the requested user information to the wireless terminal device (without prompting the user) when the wireless terminal device can be verified, based on the received certificate, as being authorized to receive the user information being requested. In this manner, the user experience may be improved by allowing the user to avoid being prompted for input when the wireless terminal device can be authenticated as being authorized by the digital credential issuer to receive the requested information.

Thus, the subject system provides a framework that allows third party entities to register their wireless terminal devices with identity credential issuers in order to obtain certificates that authorize the wireless terminal devices to receive all or part of the identity credentials issued by the issuers. The subject system also provides mechanisms for allowing the electronic devices to manage how the user information of the digital identity credentials is provided to the wireless terminal devices in response to authorized requests therefor.

Figure 1:
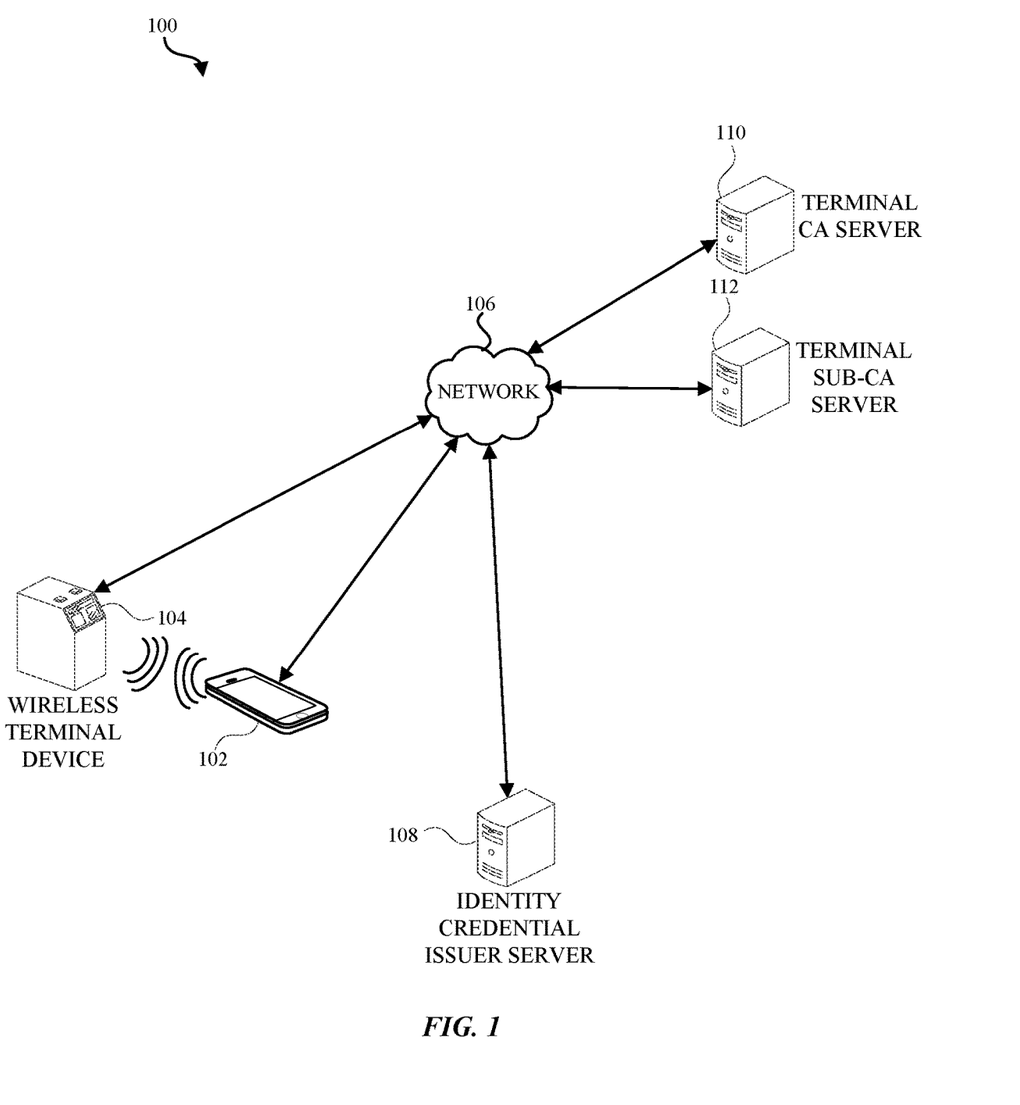
FIG. 1 illustrates an example network environment for wireless terminal authentication in accordance with one or more implementations.

FIG. 1 illustrates an example network environment 100 for wireless terminal authentication in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 102, a wireless terminal device 104, a network 106, an identity credential issuer server 108, a terminal certificate authority (CA) server 110, and a terminal sub-CA server 112. The network 106 may communicatively (directly or indirectly) couple, for example, any two or more of the electronic device 102, the wireless terminal device 104, the identity credential issuer server 108, the terminal CA server 110, and/or the terminal sub-CA server 112.

In one or more implementations, the network 106 may be an interconnected network of devices that may include, or may be communicatively coupled to, the Internet. For explanatory purposes, the network environment 100 is illustrated in FIG. 1 as including a single electronic device 102, a single wireless terminal device 104, a single identity credential issuer server 108, a single terminal CA server 110, and a single terminal sub-CA server 112; however, the network environment 100 may include any number of electronic devices, wireless terminal devices, and servers.

The electronic device 102 may be, for example, a portable computing device such as a laptop computer, a smartphone, a peripheral device (e.g., a digital camera, headphones), a tablet device, a wearable device such as a watch, a band, and the like, or any other appropriate device that includes one or more wireless interfaces, such as near-field communication (NFC) radios, WLAN radios, Bluetooth radios, Zigbee radios, cellular radios, and/or other wireless radios. In FIG. 1, by way of example, the electronic device 102 is depicted as a mobile device. The electronic device 102 may be, and/or may include all or part of, the electronic device discussed below with respect to FIG. 2, and/or the electronic system discussed below with respect to FIG. 6. In one or more implementations, the electronic device 102 may include a secure hardware component onto which applet instances, including digital identity credential applet instances, may be provisioned. An example electronic device that includes a secure hardware component, such as a secure element and/or a secure enclave processor, is discussed further below with respect to FIG. 2.

The wireless terminal device 104 may be, for example, a wireless payment terminal, a tablet device, a mobile device, and/or any device that includes one or more wireless interfaces that may be used to perform a wireless transaction, such as NFC radios, wireless local area network (WLAN) radios, Bluetooth radios, Zigbee radios, cellular radios, and/or other wireless radios. The wireless terminal device 104 may be, and/or may include all or part of, the electronic device discussed below with respect to FIG. 2, and/or the electronic system discussed below with respect to FIG. 6.

The electronic device 102 may communicate with the wireless terminal device 104 via a direct communication (e.g., peer-to-peer communication), such as NFC, Bluetooth, and/or Wi-Fi Aware that bypasses the network 106. In one or more implementations, the electronic device 102 may communicate with the wireless terminal device 104 over the network 106 and/or the wireless terminal device 104 (and/or the electronic device 102) may not be communicatively coupled to the network 106.

The identity credential issuer server 108 may include one or more servers that facilitate providing a digital identity credential for a user, such as a mobile driver's license, an electronic passport, and the like, to the electronic device 102 of the user. In one or more implementations, the identity credential issuer server 108 may be and/or may include a secure mobile platform. For example, the identity credential issuer server 108 may include one or more trusted service manager (TSM) servers that provision/transmit scripts to secure hardware components of electronic devices, such as the electronic device 102, one or more application servers, and/or the like.

In one or more implementations, a digital identity credential may include one or more data fields of user information that has been verified by the identity credential issuer server 108. For example, a digital identity credential may include a user's name, the user's age, the user's address, the user's driving privileges, or generally any user information that is verified and/or managed by the identity credential issuer server 108. The digital identity credential may include a public key corresponding to the electronic device 102, and may be signed with a private key corresponding to the identity credential issuer server 108, as is discussed further below with respect to FIG. 3.

The identity credential issuer server 108 may also include one or more servers that facilitate registering wireless terminal devices of third party entities to receive certificates that can be provided by the wireless terminal devices to electronic devices, such as the electronic device 102, with a request for user information to verify that the wireless terminal device is authorized to receive the user information being requested. In one or more implementations, the certificates may be signed by a private key corresponding to the terminal CA server 110 and/or the terminal sub-CA server 112, as is discussed further below with respect to FIG. 3. The third party entities may include governmental entities, commercial entities, or generally any entities that may need to obtain all or part of a digital identity credential issued by the identity credential issuer server 108.

In one or more implementations, the identity credential issuer server 108 may register an individual third party entity, and may authorize a terminal sub-CA server 112 of the third party entity to issue and sign certificates for the wireless terminal devices of the third party entity, as is discussed further below with respect to FIG. 3. For example, a grocery store chain may be registered with the identity credential issuer server 108 to issue certificates to its wireless terminal devices that authorize its wireless terminal devices to verify whether a user attempting to purchase alcohol is at least 21 years old.

The certificate provisioned to a wireless terminal device may include information identifying the entity corresponding to the wireless terminal device, may include information identifying the wireless terminal device itself, may include a certificate type or a class/tier of the certificate (and/or of the wireless terminal device), and/or may include a list of data fields of the digital identity credential that the wireless terminal device is authorized to receive. Each class/tier of certificates may be associated, e.g. on the user's device, with a particular subset of user information that the class/tier of certificates authorizes a wireless terminal device to receive, as is discussed further below with respect to FIG. 5. In one or more implementations, the class/tier of the certificate may be indicated by the terminal sub-CA server 112 that signed the certificate.

The terminal CA server 110 and/or the terminal sub-CA server 112 may be any servers that are configured to issue certificates to wireless terminal devices for one or more digital identity credential issuers, such as the identity credential issuer server 108. The terminal CA server 110 may authorize any number of terminal sub-CA servers, which may also be referred to as intermediate CA servers, to issue certificates on behalf of the corresponding digital credential issuer. The terminal CA server 110, the terminal sub-CA server 112, and/or the identity credential issuer server 108 may be, and/or may include all or part of, the electronic system discussed below with respect to FIG. 6.

Figure 2:
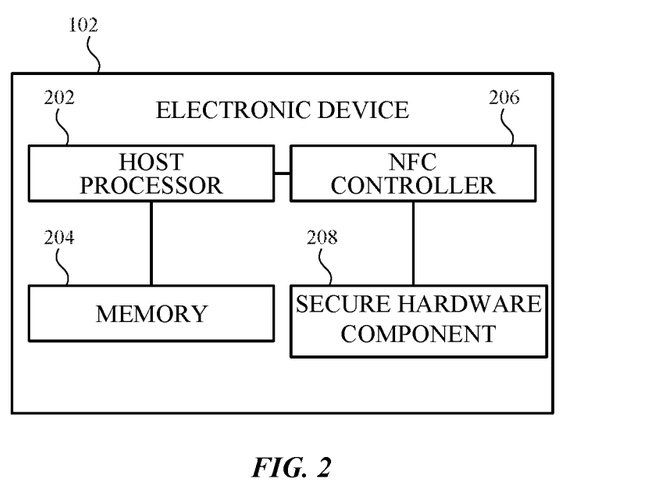
FIG. 2 illustrates an example electronic device in a wireless terminal authentication system in accordance with one or more implementations.

FIG. 2 illustrates an example electronic device 102 in a wireless terminal authentication system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a host processor 202, a memory 204, an NFC controller 206, and a secure hardware component 208, which may be, for example, a secure element and/or a secure enclave processor. The secure hardware component 208 may include one or more interfaces for communicatively coupling to the NFC controller 206 and/or the host processor 202, such as via one or more single wire protocol (SWP) connections and/or any other data connection.

The secure hardware component 208 may include one or more provisioned applet instances, e.g., corresponding to one or more digital identity credentials, one or more credit/debit card accounts, and/or one or more other applet instances. In one or more implementations, the operating system and/or execution environment of the secure hardware component 208 may be a JAVA-based operating system and/or JAVA-based execution environment, and the one or more applet instances may be JAVA-based applets. In other implementations, other operating systems, languages, and/or environments can be implemented. In addition to the one or more applet instances, the secure hardware component 208 may also include one or more additional applets for performing other operations, such as a security applet, a registry applet, and the like.

The NFC controller 206 may include one or more antennas and one or more transceivers for transmitting/receiving NFC communications. The NFC controller 206 may further include one or more interfaces, such as a single wire protocol interface, for coupling to the host processor 202 and/or the secure hardware component 208. The NFC controller 206 may be able to communicate via one or more different NFC communication protocols, such as NFC-A (or Type A), NFC-B (or Type B), and/or NFC-F (or Type F or FeliCA). The NFC-A protocol may be based on International Organization for Standardization (ISO)/International Electrotechnical Commission (IEC) 14443A and may use Miller bit coding with a 100 percent amplitude modulation. The NFC-B protocol may be based on ISO/IEC 14443B and may use variations of Manchester encoding along with a 10 percent modulation. The NFC-F protocol may be based on FeliCA JIS X6319-4 and may use a slightly different variation of Manchester coding than the NFC-B protocol.

The wireless terminal device 104 of FIG. 1 may include similar wireless communication capabilities as the electronic device 102. For example, the wireless terminal device 104 may include one or more antennas and/or transceivers for communicating with the electronic device 102 via one or more of an NFC-A protocol, an NFC-B protocol, an NFC-F protocol, a Bluetooth protocol, a Bluetooth low energy protocol, a Zigbee protocol, a Wi-Fi protocol, or generally any communication protocol. In one or more implementations, the wireless terminal device 104 may include a wireless reader, such as an NFC reader.

For explanatory purposes, the electronic device 102 is described as using the NFC controller 206 to initiate communication with the wireless terminal device 104. However, the electronic device 102 may use any wireless communication protocol to communicate with the wireless terminal device 104, such as Bluetooth, Bluetooth low energy, Wi-Fi, Zigbee, millimeter wave (mmWave), or generally any wireless communication protocol. In one or more implementations, a communication session between the electronic device 102 and the wireless terminal device 104 may be initiated over a first wireless communication, such as NFC, and then may be handed off to a second wireless communication, such as Bluetooth, Wi-Fi Aware, or the like.

The host processor 202 may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. Additionally, the host processor 202 may enable implementation of an operating system or otherwise execute code to manage operations of the electronic device 102. The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, one or more of the host processor 202, the memory 204, the NFC controller 206, the secure hardware component 208, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
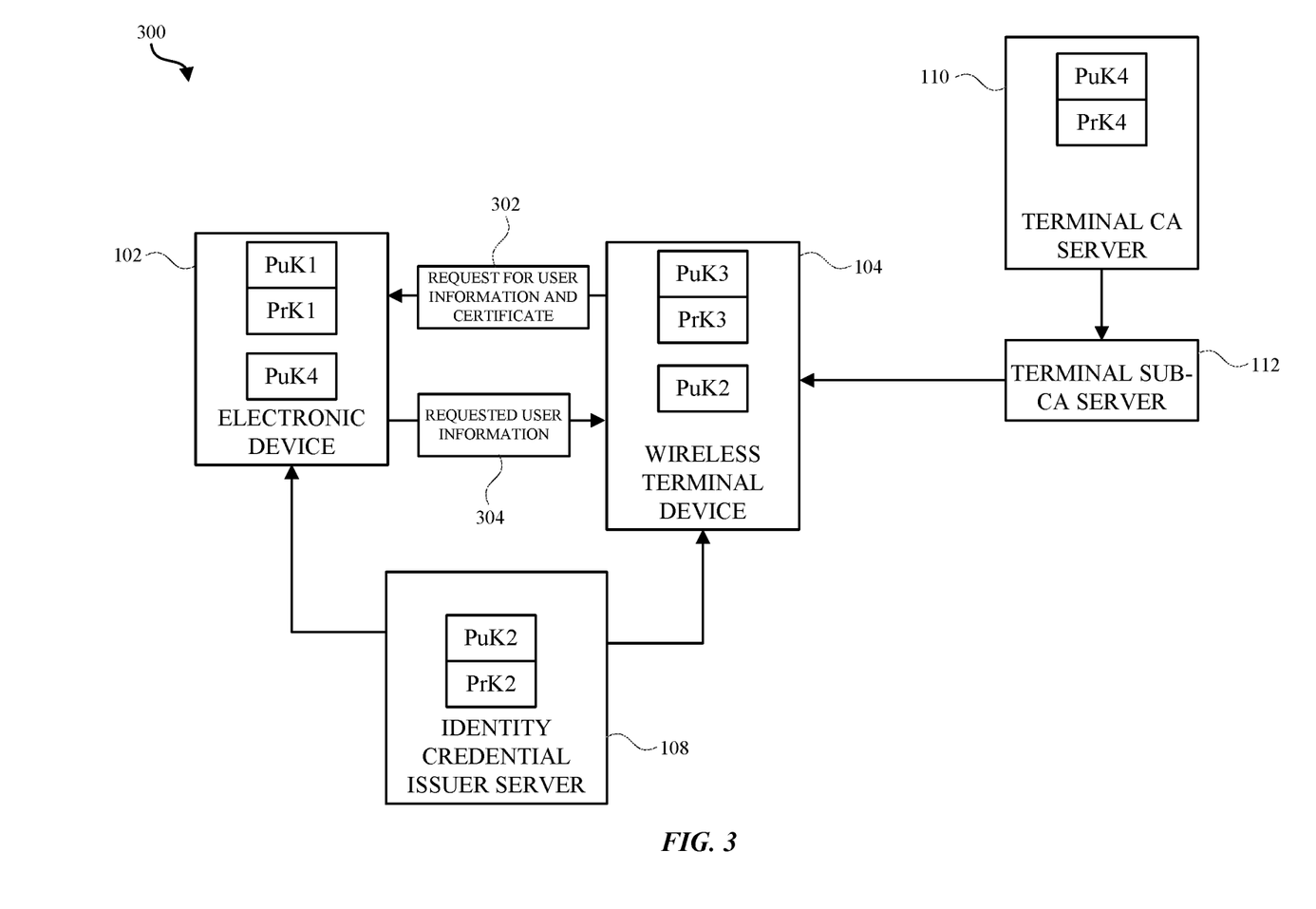
FIG. 3 illustrates an example network environment for wireless terminal authentication including distribution of keys in accordance with one or more implementations.

FIG. 3 illustrates an example network environment 300 for wireless terminal authentication including distribution of keys in accordance with one or more implementations in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The example network environment 300 includes the electronic device 102, the wireless terminal device 104, the identity credential issuer server 108, the terminal CA server 110, the terminal sub-CA server 112, as well as the request for user information message 302, and the requested user information message 304. The electronic device 102 stores a public/private key pair PuK1/PrK1, such as in the secure hardware component 208.

The electronic device 102 may provide the public key PuK1 to the identity credential issuer server 108 at the time that the digital identity credential is issued by the identity credential issuer server 108. The identity credential issuer server 108 includes the public key PuK1 in the digital identity credential and signs the digital identity credential with its private key PrK2. The identity credential issuer server 108 then provides the digital identity credential to the electronic device 102. The identity credential issuer server 108 may also provide the electronic device 102 with the public key PuK4 of the terminal CA server 110, as well as the public keys of any other terminal CA servers for which the identity credential issuer server 108 has authorized (and/or trusts). For example, the government of a country or state may have a reciprocal (or unilateral) trust agreement with another country or state and therefore may provide the public key for the terminal CA server (e.g., the root terminal CA server) of the other country or state to the electronic device 102.

The identity credential issuer server 108 also coordinates the issuance of a certificate, or a chain of certificates, to the wireless terminal device 104 by the (root) terminal CA server 110 and/or the terminal sub-CA server 112. The certificate may list particular data fields of the digital identity credential that the wireless terminal device 104 is authorized to receive and/or the certificate may include a certificate type that identifies the wireless terminal device 104 as being part of a particular tier/class, such as a law enforcement terminal (e.g., full access), a driving privilege verification terminal (e.g., personal identification and driving privilege access), or an age verification terminal (e.g., age verification access only). In one or more implementations, the user of the electronic device 102 may be able to configure which portions of the user information contained in the digital identity credential are authorized to be provided to each class/tier of certificates.

The certificate and/or a certificate in the chain of certificates (e.g., the root certificate) may be signed by the private key PrK4 of the terminal CA server 110, and, in one or more implementations, the certificate may include the public key PuK3 of the wireless terminal device 104. The identity credential issuer server 108 may also provide the wireless terminal device 104 with the public key PuK2 of the identity credential issuer server 108, such that the wireless terminal device 104 can verify that a digital identity credential (and/or portion thereof) provided by the electronic device 102 was issued by the identity credential issuer server 108.

Thus, once a certificate has been provisioned to the wireless terminal device 104 and a digital identity credential has been provisioned to the electronic device 102, when a peer-to-peer connection is established between the devices 102, 104, the wireless terminal device 104 may transmit a request for user information message 302 to the electronic device 102, along with the certificate issued to the wireless terminal device 104. The electronic device 102 may verify that the certificate (or the root certificate in a chain of certificates) was signed by the terminal CA server 110 by using the public key PuK4 of the terminal CA server 110. The electronic device 102 may also determine, based at least in part on the information contained in the certificate, the particular portion of the user information contained in the digital identity credential that the wireless terminal device 104 is authorized to receive.

When the electronic device 102 determines that the wireless terminal device 104 is authorized to receive a particular portion (or all) of the digital identity credential, the electronic device 102 transmits the requested user information message 304 to the wireless terminal device 104 over the peer-to-peer connection. The requested user information message 304 may include the entire digital identity credential, or the portion of the digital identity credential that the wireless terminal device 104 is authorized to receive. The portion (or all) of the digital identity credential may be signed by the private key PrK2 of the identity credential issuer server 108, such that the wireless terminal device 104 can verify, using the public key PuK2 of the identity credential issuer server 108, that the digital identity credential was signed by the identity credential issuer server 108. In one or more implementations, the electronic device 102 may encrypt the requested user information message 304 using the public key PuK3 of the wireless terminal device 104 when the public key PuK3 is included in the received certificate. An example process of the electronic device 102 receiving the request for user information message 302 from the wireless terminal device 104 and responsively providing the requested user information message 304 is discussed further below with respect to FIG. 4.

Figure 4:
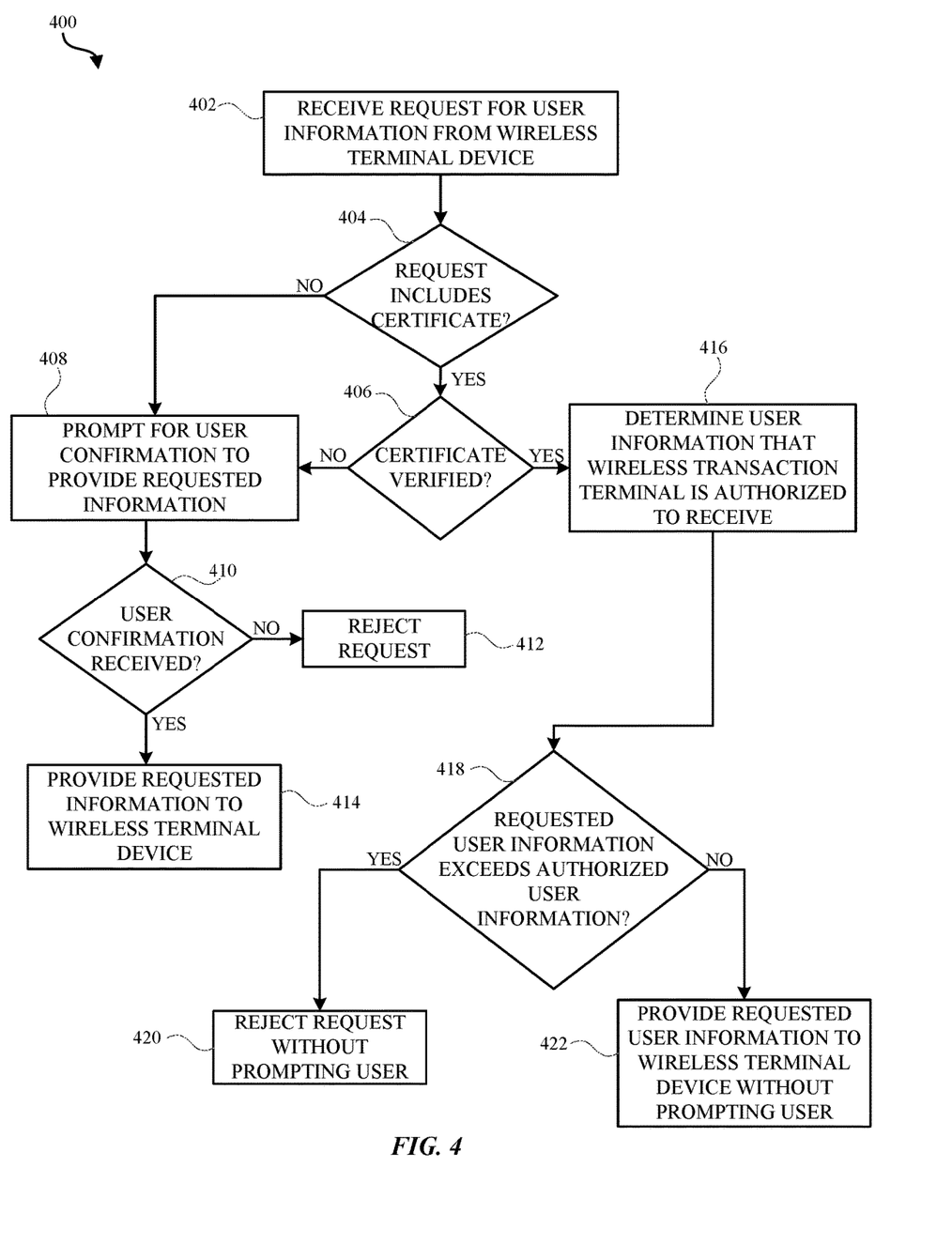
FIG. 4 illustrates a flow diagram of an example process of an electronic device in a wireless terminal authentication system in accordance with one or more implementations.

FIG. 4 illustrates a flow diagram of an example process 400 of an electronic device 102 in a wireless terminal authentication system in accordance with one or more implementations. For explanatory purposes, the process 400 is primarily described herein with reference to the electronic device 102 of FIGS. 1-3. However, the electronic device 102 is presented as an exemplary device and the operations described herein may be performed by any suitable device. Further for explanatory purposes, the operations of the process 400 are described herein as occurring in serial, or linearly. However, multiple operations of the process 400 may occur in parallel. In addition, the operations of the process 400 need not be performed in the order shown and/or one or more of the operations of the process 400 need not be performed and/or can be replaced by other operations.

The process 400 begins when the electronic device 102 receives a request for user information from a wireless terminal device, such as the wireless terminal device 104 (402). For example, the electronic device 102 may be moved within a proximity of the wireless terminal device 104 and may initiate a communication session with the wireless terminal device 104 via a first wireless connection, such as an NFC connection. The first wireless connection (which itself may be a peer-to-peer connection) may be used for communication of the request for user information and/or the first wireless connection may be used to establish and handoff the communication session to a second wireless connection (which may also be a peer-to-peer connection), such as Bluetooth, Wi-Fi Aware, or generally any other wireless connection.

In one or more implementations, the received request for user information may be a request for the entirety of the user's digital identity credential, and/or the request for information may specify one or more data fields of the user's digital identity credential for which the user information is being requested.

The electronic device 102 determines whether the received request for user information was transmitted with a certificate and/or a chain of certificates (404). For example, one or more wireless terminal devices may not be registered with the identity credential issuer server 108, and/or may not otherwise have a certificate. If the electronic device 102 determines that the request for user information was transmitted with a certificate (404), the electronic device 102 determines whether the certificate can be verified (406). For example, the electronic device 102 may verify, using the public key PuK4 of the terminal CA server 110, that the certificate (or a root certificate in a chain of certificates) was signed using the private key PrK4 of the terminal CA server 110.

If the electronic device 102 determines that the request for user information was not transmitted with a certificate (404), and/or if the electronic device 102 cannot verify the certificate (406), the electronic device 102 prompts for user confirmation that the requested information should be provided to the wireless terminal device 104 (408). For example, the electronic device 102 may display a prompt to the user that requests that the user confirm that the requested information be provided to the wireless terminal device 104. If the user confirmation is not received (410), the electronic device 102 rejects the request for information (412). If the user confirmation is received (410), the electronic device 102 provides the requested information to the wireless terminal device 104, such as via the established peer-to-peer connection (414).

In one or more implementations, the electronic device 102 may also provide the user with an option to set a preference to subsequently allow the requested information to be provided to the wireless terminal device 104 (and/or other wireless terminal devices in the same class/tier) without prompting the user for confirmation. If the user sets the preference to subsequently allow the requested information to be provided to the wireless terminal device 104 without prompting the user, the electronic device 102 may store an association between the requested information and the wireless terminal device 104 and/or the certificate provided by the wireless terminal device 104, if any.

If the electronic device 102 verifies the certificate (406), the electronic device 102 determines the user information that the wireless terminal device is authorized to receive (416). For example, the verified certificate may list particular data fields of the digital identity credential that the wireless terminal device 104 is authorized to receive. In one or more implementations, the certificate may indicate and/or may be associated with a particular class or tier of certificates. For example, the certificate may include a certificate type identifier and/or the class/tier may be indicated by the terminal sub-CA server 112 that signed the certificate. In one or more implementations, multiple terminal sub-CA servers may be able to sign certificates of the same class/tier. For example, each state may have different terminal sub-CA servers for signing mobile driver's licenses; however, the different terminal sub-CA servers may be associated with the same certificate class/tier (e.g., law enforcement). In one or more implementations, by default each different class/tier of certificates may be authorized to receive particular user information, which may be further configured by the user of the electronic device 102, as is discussed further below with respect to FIG. 5.

The electronic device 102 determines whether the user information being requested by the wireless terminal device 104 exceeds the user information that the wireless terminal device 104 is authorized to receive. If the electronic device 102 determines that the requested user information exceeds the authorized user information (418), the electronic device 102 rejects the request for user information without prompting the user (420). In one or more implementations, the user may be able to configure the electronic device 102 to prompt the user for confirmation before automatically rejecting the request when the requested user information exceeds the user information that the wireless terminal device 104 is authorized to receive.

If the electronic device 102 determines that the requested user information does not exceed the authorized user information (418), the electronic device 102 provides the requested user information to the wireless terminal device 104 via the established peer-to-peer connection without prompting the user for confirmation (422). For example, the electronic device 102 may allow the user to set a preference indicating that the user would like the electronic device 102 to automatically (or not automatically) provide requested information to the particular wireless terminal device 104, any wireless terminal device of a particular class/tier, or any wireless terminal device, when the requesting wireless terminal device is determined to be authorized to receive the requested information.

Figure 5:
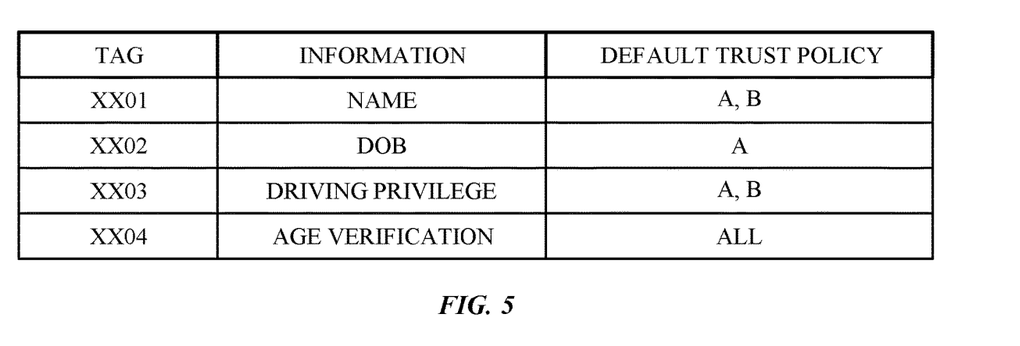
FIG. 5 illustrates example default trust policies for different portions of user information of an example digital identity credential in accordance with one or more implementations.

FIG. 5 illustrates example default trust policies for different portions of user information of an example digital identity credential in accordance with one or more implementations. Not all of the depicted fields may be used in all implementations, however, and one or more implementations may include additional or different fields than those shown in the figure. Variations in the arrangement and type of the fields may be made without departing from the spirit or scope of the claims as set forth herein. Additional fields, different fields, or fewer fields may be provided.

The example default trust policies of FIG. 5 may be utilized in one or more implementations where multiple tiers/classes of certificates are issued, such as an 'A' class of certificates, a 'B' class of certificates, etc. As shown in FIG. 5, certificates in the 'A' or 'B' class are authorized to receive the 'Name' and 'Driving privilege' information (e.g., fields) of the digital identity credential, while only the 'A' class of certificates are authorized to receive the 'DoB' information of the digital identity credential, and any class of certificate is authorized to receive the 'Age verification' information of the digital identity certificate. For example, the 'Age verification' information may indicate whether the user is at least a certain age, such as 21. Thus, the 'Age verification' information can be provided without providing the user's date of birth or/or other user information.

In one or more implementations, the electronic device 102 may provide the user with a user interface for configuring what information can be provided to each class/tier of certificates and for indicating whether the information can be provided automatically, e.g. without prompting the user for confirmation.

Figure 6:
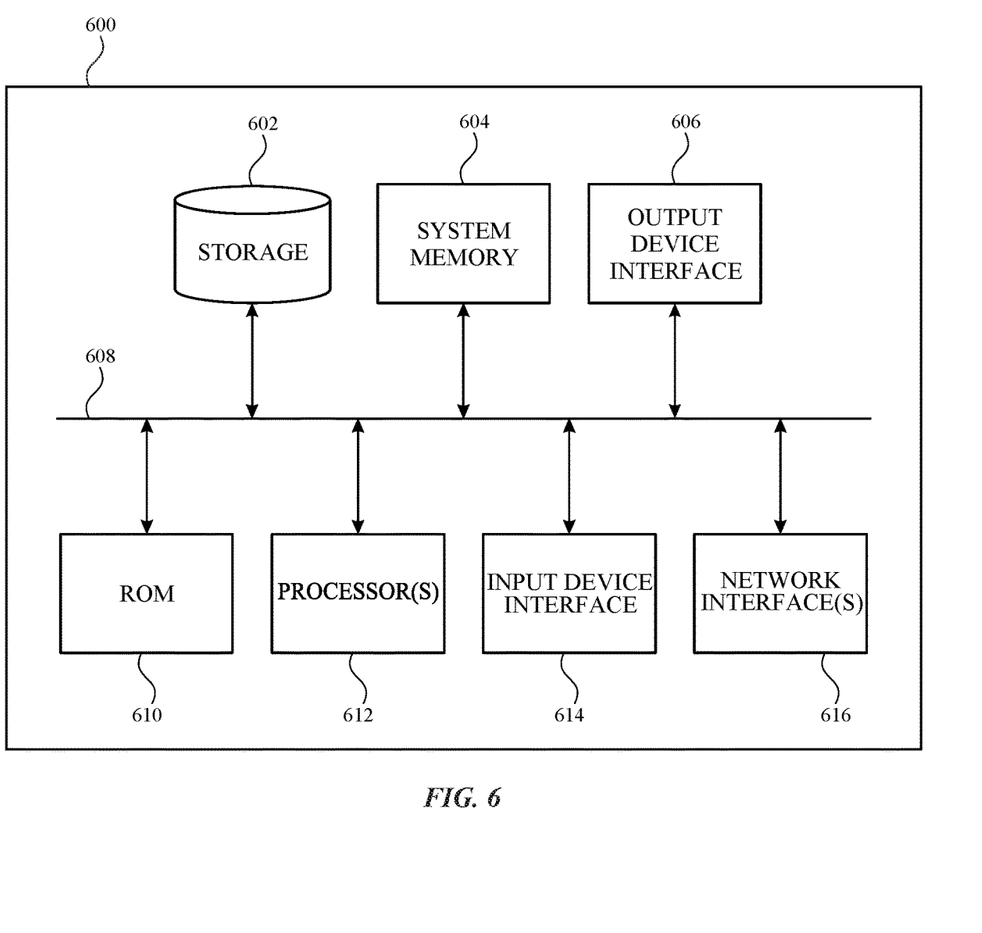
FIG. 6 conceptually illustrates an example electronic system with which aspects of the subject technology may be implemented in accordance with one or more implementations.

FIG. 6 conceptually illustrates an electronic system 600 with which one or more implementations of the subject technology may be implemented. The electronic system 600 can be, and/or can be a part of, the electronic device 102, the wireless terminal device 104, and/or one or more of the servers 108, 110, 112 shown in FIG. 1. The electronic system 600 may include various types of computer readable media and interfaces for various other types of computer readable media. The electronic system 600 includes a bus 608, one or more processing unit(s) 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks and/or to one or more network nodes, such as the electronic device 102 shown in FIG. 1, through the one or more network interface (s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

As described above, one aspect of the present technology is the gathering and use of data available from specific and legitimate sources to improve provisioning applets on users' devices. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to provision applets in accordance with a user's preferences. Accordingly, use of such personal information data enables users to have greater control of the provisioned applets. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of provisioning applets, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, applets can be selected and provisioned to users' devices based on aggregated non-personal information data or a bare minimum amount of personal information, such as the content being handled only on the user's device or other non-personal information available to the applet provisioning services.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
receiving, by a user electronic device and from a wireless terminal device via an NFC communication, a request for user information, the request comprising a certificate corresponding to the wireless terminal device;
verifying, by the user electronic device, the certificate based at least in part on a public key that was stored on the user electronic device prior to receipt of the request;
when the certificate is verified, determining, by the user electronic device, whether the certificate indicates that the wireless terminal device is authorized to receive the requested user information, and transmitting, by the user electronic device and to the wireless terminal device, the requested user information without prompting for user input when the certificate indicates that the wireless terminal device is authorized to receive the requested user information; and
when the certificate cannot be verified, prompting for user confirmation to provide the requested user information to the wireless terminal device.

2. The method of claim 1, further comprising:
when the user confirmation is received, transmitting, to the wireless terminal device, the requested user information and storing an association between the certificate and the user confirmation.

3. The method of claim 2, further comprising:
receiving, by the user electronic device and from the wireless terminal device, another request for user information, the other request comprising the certificate corresponding to the wireless terminal device; and
responsive to the other request, and based on the stored association between the certificate and the user confirmation, automatically transmitting the requested user information without prompting for user confirmation.

4. The method of claim 1, wherein the request comprises a chain of certificates that includes the certificate and verifying the certificate based at least in part on the public key stored on the user electronic device comprises:
verifying that a root certificate of the chain of certificates is signed with a private key that corresponds to the public key stored on the user electronic device.

5. The method of claim 1, wherein determining whether the certificate indicates that the wireless terminal device is authorized to receive the requested user information comprises:
determining whether the certificate lists data fields that correspond to the requested user information.

6. The method of claim 1, wherein determining whether the certificate indicates that the wireless terminal device is authorized to receive the requested user information comprises:

determining a trust policy associated with a certificate type listed on the certificate; and determining whether the trust policy allows access to the requested user information.

7. The method of claim 1, wherein the request for user information is received responsive to initiating, by the user electronic device, the NFC communication with the wireless terminal device.

8. The method of claim 1, wherein the requested user information is transmitted via the NFC communication.

9. A device comprising:
a wireless interface configured to establish a peer-to-peer connection with a wireless terminal device;
at least one processor configured to:
receive, from the wireless terminal device and via the peer-to-peer connection, a request for user information, the request comprising a certificate associated with the wireless terminal device;
verify whether the wireless terminal device is authorized to receive the requested user information based at least in part on the certificate and a key stored on the device prior to receipt of the request;
transmit, to the wireless terminal device and via the peer-to-peer connection, the requested user information without prompting for user input when the wireless terminal device is verified as being authorized to receive the requested user information; and
prompt for user confirmation to provide the requested user information to the wireless terminal device when the wireless terminal device cannot be verified as authorized to receive the requested user information based at least in part on the certificate and the key.

10. The device of claim 9, wherein the peer-to-peer connection comprises at least one of a near-field communication (NFC) connection, a Bluetooth connection, or a Wi-Fi Aware connection.

11. The device of claim 9, wherein the at least one processor is further configured to:
receive an indication of a user preference to automatically transmit the requested user information to the wireless terminal device when the wireless terminal device is verified as being authorized to receive the requested user information, wherein the requested user information is automatically transmitted to the wireless terminal device based at least in part on the indication of the user preference.

12. The device of claim 9, wherein the user information is contained in a user identity credential issued by an identity credential issuer server and the identity credential issuer server authorizes the wireless terminal device to receive the requested user information.

13. The device of claim 9, further comprising a memory configured to store the key which corresponds to a trusted certificate authority, wherein the at least one processor is configured to verify that the wireless terminal device is authorized to receive the requested user information by verifying that the certificate is signed with a private key that corresponds to the stored key.

14. The device of claim 13, wherein the at least one processor is further configured to:
identify a certificate type corresponding to the certificate;
determine a trust policy associated with the certificate type; and verify that the wireless terminal device is authorized to receive the requested user information when the trust policy is associated with the requested user information.

15. A non-transitory machine-readable medium comprising code that, when executed by at least one processor, causes the at least one processor to perform operations, the code comprising:
code to receive, from a wireless terminal device and via a peer-to-peer connection, a request for user information;
code to determine whether the request comprises a certificate corresponding to the wireless terminal device;
code to determine whether the wireless terminal device is authorized to receive the requested user information based at least in part on the certificate when the request comprises the certificate;
code to prompt for user confirmation to provide the requested user information when the request does not include the certificate or when the wireless terminal device cannot be authorized to receive the requested user information based at least in part on the certificate; and
code to transmit, via the peer-to-peer connection, the requested user information to the wireless terminal device without prompting for user input when the wireless terminal device is determined to be authorized to receive the requested user information and transmit, via the peer-to-peer connection, the requested information when the user confirmation is received to provide the requested user information.

16. The non-transitory machine readable medium of claim 15, wherein the code further comprises:
code to receive an indication of a user preference to automatically transmit, without prompting the user, the requested user information to the wireless terminal device when the wireless terminal device is determined to be authorized to receive the requested user information.

17. The non-transitory machine readable medium of claim 15, wherein the requested user information is stored in an identity credential issued by an identity credential issuer and a locally stored public key used to determine whether the wireless terminal device is authorized to receive the requested user information corresponds to the identity credential issuer.

18. The non-transitory machine readable medium of claim 15, wherein the code further comprises code to reject the request when the certificate is verified and the wireless terminal device is determined to not be authorized to receive the requested user information.

19. The non-transitory machine readable medium of claim 15, wherein the peer-to-peer connection comprises at least one of a near-field communication (NFC) connection, a Bluetooth connection, or a Wi-Fi Aware connection.

20. The non-transitory machine readable medium of claim 15, wherein the code further comprises:
code to initiate the peer-to-peer connection with the wireless terminal device, wherein the request for user information is received responsive to initiation of the peer-to-peer connection.

* * * * *